UNITED STATES PATENT OFFICE.

AUGUSTINUS WALLENBERG, OF CHICAGO, ILLINOIS.

ARTIFICIAL STONE.

SPECIFICATION forming part of Letters Patent No. 517,811, dated April 3, 1894.

Application filed May 2, 1893. Serial No. 472,781. (No specimens.)

*To all whom it may concern:*

Be it known that I, AUGUSTINUS WALLENBERG, a subject of the King of Sweden and Norway, now residing at Chicago, in the county of Cook and State of Illinois, have invented certain new and useful Improvements in Artificial Stone, of which the following is a specification.

My invention has reference to imitations of marble and other stone-work and it will be understood from the following description.

I first prepare a mixture of plaster of paris with an equal quantity of water into which is stirred suitable coloring matter to an amount and in proportions depending upon the shade and color desired, for instance: one pound plaster of paris, mixed, as stated, with an equal quantity of water, one-tenth of a pound of red cinnabar or vermilion; the whole being stirred to the consistency of a dough or thick paste and then spread upon a smooth surface, slab of glass or smooth metal, to the depth of the ornamental facing desired, say one-eighth of an inch or more. To back this facing and give it proper strength it is covered to a suitable depth with a mixture proportioned about as follows: one pound sand, one pound cement, one pound plaster of paris, commingled and mixed with water to the consistency of a thick dough. When the whole has set it is removed from the slab and the face is treated to render it impervious to moisture: for this purpose the following mixture being used in about the proportions stated, to wit: one liter lacquer, one-third liter raw linseed oil, one-fourth liter turpentine; and this mixture is spread on the face or surface after the latter is dry. This water-proof mixture having been applied, talc is spread on the top and it is polished by being rubbed with the hand or with chamois skin or other agency until the desired finish is obtained.

It will be understood that imitations of veins or the appearance of mottled surface will be produced by the stirring of the coloring material into the plaster of paris before or after it is applied to the slab and that the intermixing will not give such variegated appearance, if it be so thorough as to result in an entirely equal and homogeneous distribution of the color.

I do not intend to limit myself to the precise materials herein named or to the proportions herein given, as it is evident that some of them may be substituted for known equivalents and that the proportions may vary according to the judgment, or to the exigencies of the case, for strength, or to intensify the colors of the stone.

I claim as my invention—

The artificial stone herein described having a face of plaster of paris and coloring matter, water-proofed with lacquer, linseed oil and turpentine, and a backing of sand, cement and plaster of paris, all in about the proportions and under the conditions set forth.

AUGUSTINUS WALLENBERG.

Witnesses:
TORVALD NYSTROM,
ALICE S. WELLS.